United States Patent
Winstead et al.

(10) Patent No.: US 7,823,548 B2
(45) Date of Patent: Nov. 2, 2010

(54) ADJUSTING BALLISTIC VALVE TIMING

(75) Inventors: Vince Winstead, Mankato, MN (US); Donald J. Lewis, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 177 days.

(21) Appl. No.: 12/326,817

(22) Filed: Dec. 2, 2008

(65) Prior Publication Data

US 2009/0078221 A1   Mar. 26, 2009

Related U.S. Application Data

(63) Continuation of application No. 11/106,893, filed on Apr. 15, 2005, now Pat. No. 7,458,345.

(51) Int. Cl.
*F01L 9/04* (2006.01)

(52) U.S. Cl. ............. 123/90.11; 123/90.15; 251/129.01

(58) Field of Classification Search .............. 123/90.11, 123/90.15, 90.17, 90.16; 251/129.01, 129.15, 251/129.16; 361/144, 152, 154
See application file for complete search history.

(56) References Cited

U.S. PATENT DOCUMENTS

| | | | |
|---|---|---|---|
| 5,005,552 A | 4/1991 | Kawamura | |
| 6,066,999 A | 5/2000 | Pischinger | |
| 6,076,490 A | 6/2000 | Esch et al. | |
| 6,220,233 B1 | 4/2001 | Pierpont | |
| 6,374,813 B1 | 4/2002 | Iida et al. | |
| 6,390,036 B1 | 5/2002 | Yuuki | |
| 6,679,223 B2 | 1/2004 | Sakakibara | |
| 6,805,079 B1 | 10/2004 | Brehob et al. | |
| 6,810,841 B1 | 11/2004 | Peterson et al. | |
| 7,165,518 B2 | 1/2007 | Ervin et al. | |
| 7,204,210 B2 | 4/2007 | Ervin et al. | |
| 7,640,899 B2 * | 1/2010 | Lewis et al. | 123/90.11 |
| 2001/0002586 A1 | 6/2001 | Taniguchi et al. | |
| 2001/0037779 A1 | 11/2001 | Iida et al. | |
| 2002/0096134 A1 | 7/2002 | Michelini et al. | |
| 2002/0148422 A1 | 10/2002 | Shiraishi et al. | |
| 2004/0206319 A1 | 10/2004 | Sedda et al. | |
| 2006/0231050 A1 | 10/2006 | Lewis et al. | |

FOREIGN PATENT DOCUMENTS

| | | |
|---|---|---|
| FR | 2851367 | 2/2003 |
| WO | 03021086 | 3/2003 |

* cited by examiner

*Primary Examiner*—Ching Chang
(74) *Attorney, Agent, or Firm*—Allan J. Lippa; Alleman Hall McCoy Russell & Tuttle LLP

(57) ABSTRACT

A method to adjust timing of an electrically actuated valve, said electrically actuated valve operating in a cylinder of an internal combustion engine, the method comprising during a cycle of said cylinder, opening said electrically actuated valve at a first valve opening position without activating a valve opening coil, and closing the valve at a first closing position; and during a second subsequent cycle of said cylinder, opening said electrically actuated valve at a second opening position that is varied based on the crankshaft angle at which said first closing occurs, where the second opening position is increased as said the crankshaft angle at which the first closing occurs increases.

16 Claims, 7 Drawing Sheets

ADJUSTING BALLISTIC VALVE TIMING

CROSS REFERENCE TO PARENT APPLICATION

This present application is a continuation of U.S. application Ser. No. 11/106,893 filed Apr. 15, 2005, entitled "Adjusting Ballistic Valve Timing", naming Vince Winstead and Donald J. Lewis as inventors, the entire contents of which are incorporated herein by reference.

FIELD

The present description relates to a method for controlling electrically actuated valves operating in a cylinder of an internal combustion engine.

BACKGROUND

One method to control intake and exhaust valve operation during engine operation is described in French Patent application. No. FR 2851367 A1. This method presents a means to control a dual coil electromagnetically actuated valve using a single coil. The approach attempts to open an electrically actuated valve by controlling current to one of the two valve actuator coils, namely, the closing coil. By reducing current to the valve closing coil, a closed valve can accelerate from a closed position to an open position, and then oscillate in a damped trajectory. The valve can be set to a closed position by energizing a closing coil, at least during a portion of the valve oscillation period. This mode of valve control is sometimes referred to as "Ballistic" mode.

The above-mentioned method can also have a disadvantage due to changes in the valve apparatus, for example. In this mode of operation, the valve opening duration can be affected by the collective mass of the actuator armature and valve, actuator spring forces, cylinder pressure, and the friction forces of the apparatus because the before-mentioned method can be influenced by the natural response (i.e., the behavior of an electrical or mechanical system due to internal energy storage) of the valve actuator system during the valve opening period. Consequently, a change to the valve actuator system can alter the valve opening duration and a corresponding cylinder air charge that may be inducted during a valve opening period. For example, deposits can form on intake valves during the course of engine operation. These deposits can increase the weight of the valve and may cause the natural response of the valve to change. In addition, lower temperatures can cause friction forces of the valve actuator assembly to increase, thereby changing the natural response and/or opening period of the valve.

The inventors herein have recognized the above-mentioned disadvantages and have developed a method of electromechanical valve control that offers substantial improvements.

SUMMARY

One embodiment of the present description includes a method to adjust timing of an electrically actuated valve, said electrically actuated valve operating in a cylinder of an internal combustion engine, the method comprising: opening and closing said electrically actuated valve without activating a valve opening coil, during a cycle of said cylinder; and varying the opening position of said electrically actuated valve as the closing position of said electrically actuated valve varies, during a subsequent cycle of said cylinder.

By adjusting the opening position of an electrically actuated valve that is operated in a ballistic mode, it may be possible to reduce inducted air mass variation that may be caused by system changes. In one example, it may be possible to maintain a desired air charge if deposits form on a valve, altering the valve mass, by varying the valve opening position. In other words, conditions that may change the natural frequency of a valve actuator apparatus can be compensated for so that ballistic mode valve control may be used as engine operating conditions may vary.

Further, in another example, it may be possible to vary the inducted air amount by adjusting the valve opening position relative to a crankshaft position. For example, in Ballistic mode, releasing a valve armature at a single crankshaft angle can produce a substantially constant inducted air mass. However, the inducted air mass may be altered by advancing or retarding the valve opening position since the amount of air inducted into a cylinder can vary because the pressure differential across the valve can vary as the crankshaft position varies.

The present description may provide several advantages. In particular, the approach may allow Ballistic mode valve timing to be used over a wider range of engine operating conditions, thereby reducing power consumption (Ballistic mode may offer a power reduction of up to 50% for electrical valves). Another advantage that may be achieved by the method is that lower amounts of inducted air may be regulated. This is possible because valve opening timing can be controlled relative to crankshaft timing. In yet another advantage, air amount may be regulated even though the natural frequency of the valve apparatus may change.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
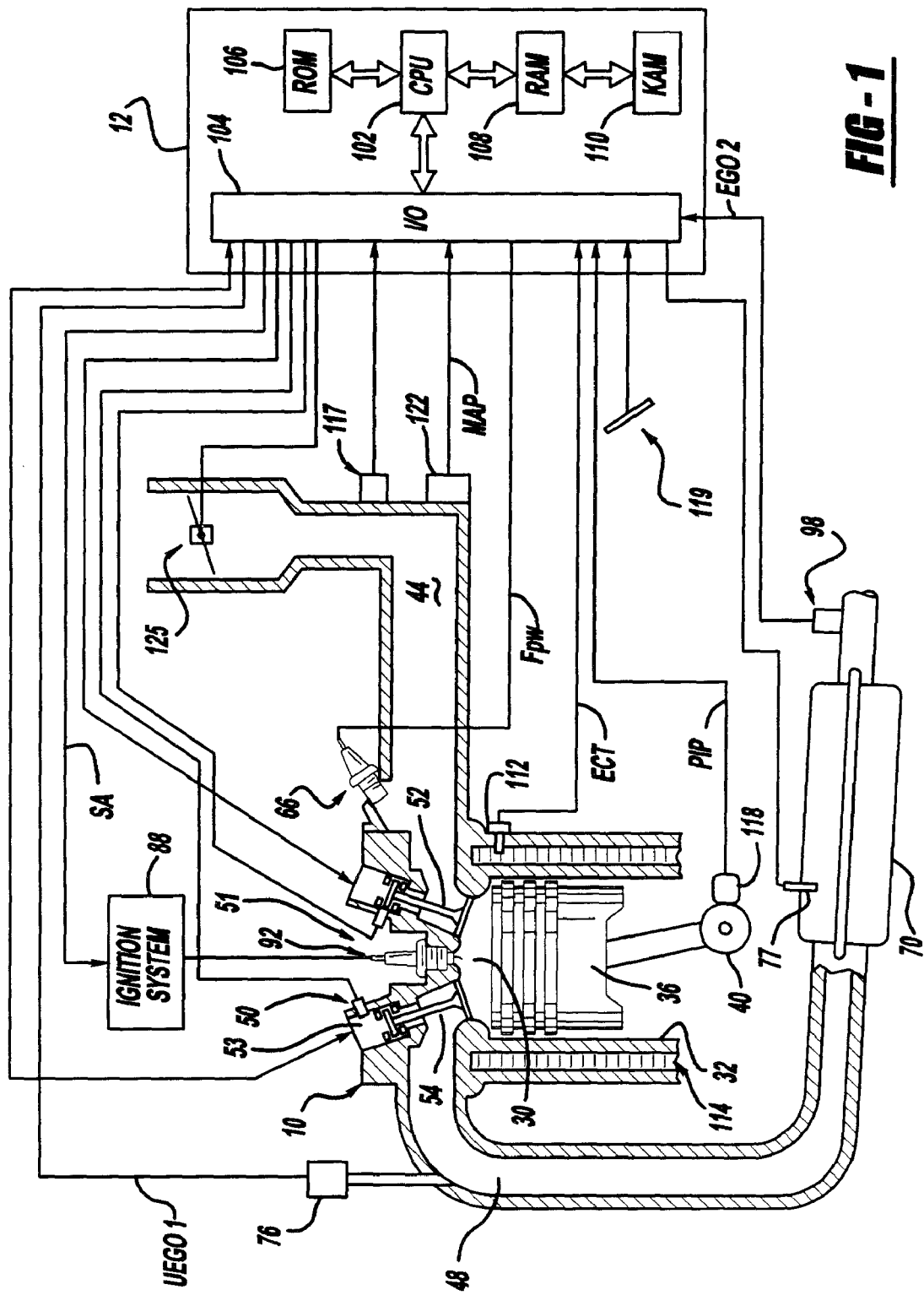
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 an exhaust valve 54. Each intake and exhaust valve is operated by an electromechanically controlled valve coil and armature assembly 53. Alternatively, the intake 52 or exhaust 54 valve may be mechanically actuated. Armature temperature is determined by temperature sensor 51. Valve position is determined by position sensor 50. Valve position may be determined by linear variable displacement, discrete, or optical transducers or from actuator current measurements. In an alternative example, each valve actuator for valves 52 and 54 has a position sensor and a temperature sensor. In yet another alternative example, armature temperature may be determined from actuator power consumption since resistive losses can scale with temperature.

Intake manifold 44 is also shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust manifold 48 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to a accelerator pedal; a measurement of engine manifold pressure (MAP) from pressure sensor 122 coupled to intake manifold 44; a measurement (ACT) of engine air amount temperature or manifold temperature from temperature sensor 117; and a engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2:
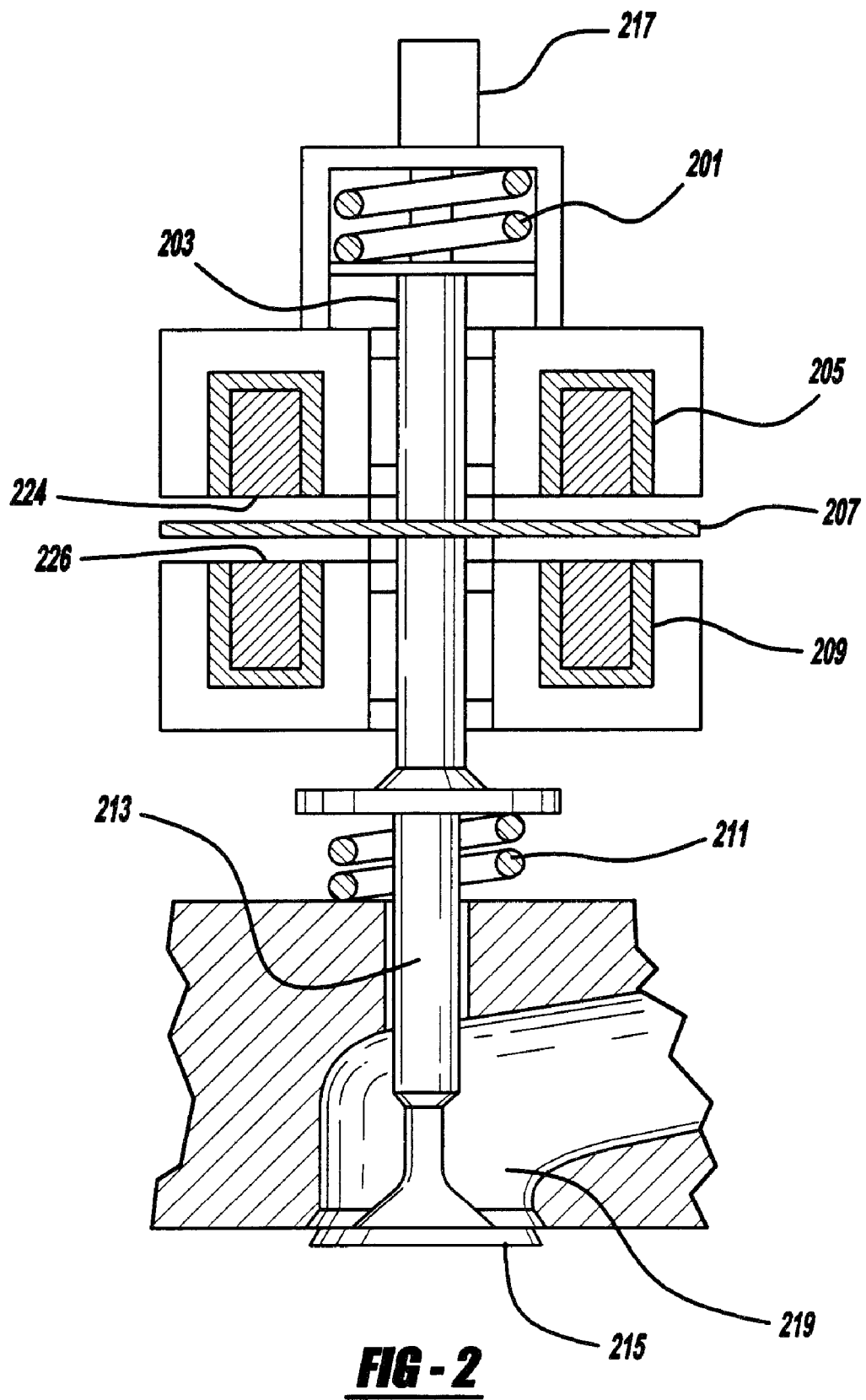
FIG. 2 is a schematic diagram that shows an electrically actuated valve in a neutral state.

Referring to FIG. 2, a schematic of an example electrically actuated valve is shown. The valve actuator is shown in a de-energized state (i.e., no electrical current is being supplied to the valve actuator coils). The electromechanical valve apparatus is comprised of an armature assembly and a valve assembly. The armature assembly is comprised of an armature return spring 201, a valve closing coil 205, a valve opening coil 209, an armature plate 207, a valve displacement transducer 217, and an armature stem 203. When the valve coils are not energized the armature return spring 201 opposes the valve return spring 211, valve stem 213 and armature stem 203 are in contact with one another, and the armature plate 207 is essentially centered between opening coil 209 and closing coil 205. This allows the valve head 215 to assume a partially open state with respect to the port 219. When the armature is in the fully open position the armature plate 207 is in contact with the opening coil magnetic pole face 226. When the armature is in the fully closed position the armature plate 207 is in contact with the closing coil magnetic pole face 224.

In one embodiment, armature plate 207 includes permanent magnets. In another embodiment, armature plate 207 does not include permanent magnets. Permanent magnets may be used to reduce valve actuator current because the permanent magnet can hold the valve in a closed position in the absence of a holding current, at least during some conditions.

During Ballistic mode, valve armature plate 207 can be released and/or repelled from a closed position by reducing current flow to closing coil 205 and/or by controlling the direction of current flow so that coil polarity forces the actuator plate away from the coil. Typically, valve actuators comprising permanent magnet armatures can repel and attract the armature by controlling current to the opening and/or closing coil. On the other hand, other types of valve actuators may be limited to attracting an armature, non-permanent magnet armature actuators for example. By applying force to actuator armature 203, valve opening spring 201 and/or magnetic force can cause armature plate 207 to move away from closing coil pole face 224. As a result, this armature movement can cause valve 213 to lift off the valve seat and begin to open port 219. After being released and/or repelled, and if not captured by the opening coil, the actuator armature 203 can reach a position where it reverses direction and travels back toward closing coil 224. Specifically, a force balance is applied to armature 203 by opening spring 201 and closing spring 211 that can cause this armature direction reversal. If actuator closing coil 205 is energized as armature plate 207 approaches closing pole face 224, the armature can be captured and the valve set to a closed position. As mentioned above, factors that can affect the natural frequency of the valve apparatus (e.g., opening and closing springs, armature, valve mass, friction factors, etc.) can affect the valve opening duration when a valve is controlled by a single coil. Thus, during ballistic mode control, valve position can be related to a time trajectory that describes the natural valve response, the engine position that the valve is released, and the magnetization of the closing coil during valve closing.

Figure 5:
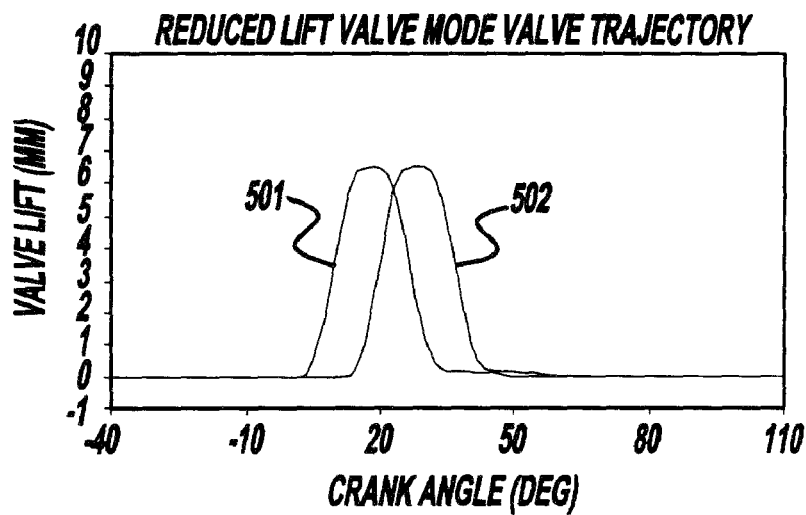
FIG. 5 is an example plot of simulation data that shows a valve trajectory for a valve operated in a hyper-ballistic valve mode.
Figure 5:
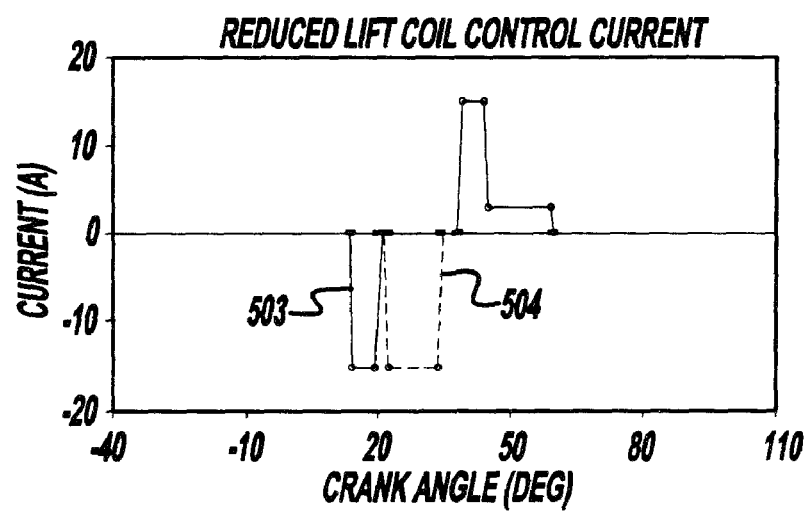
Figure 5:
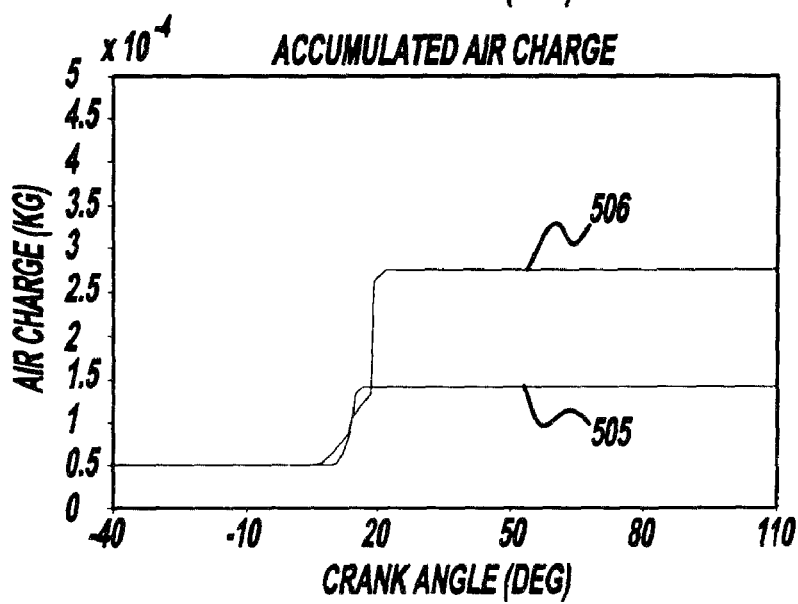
Figure 6:
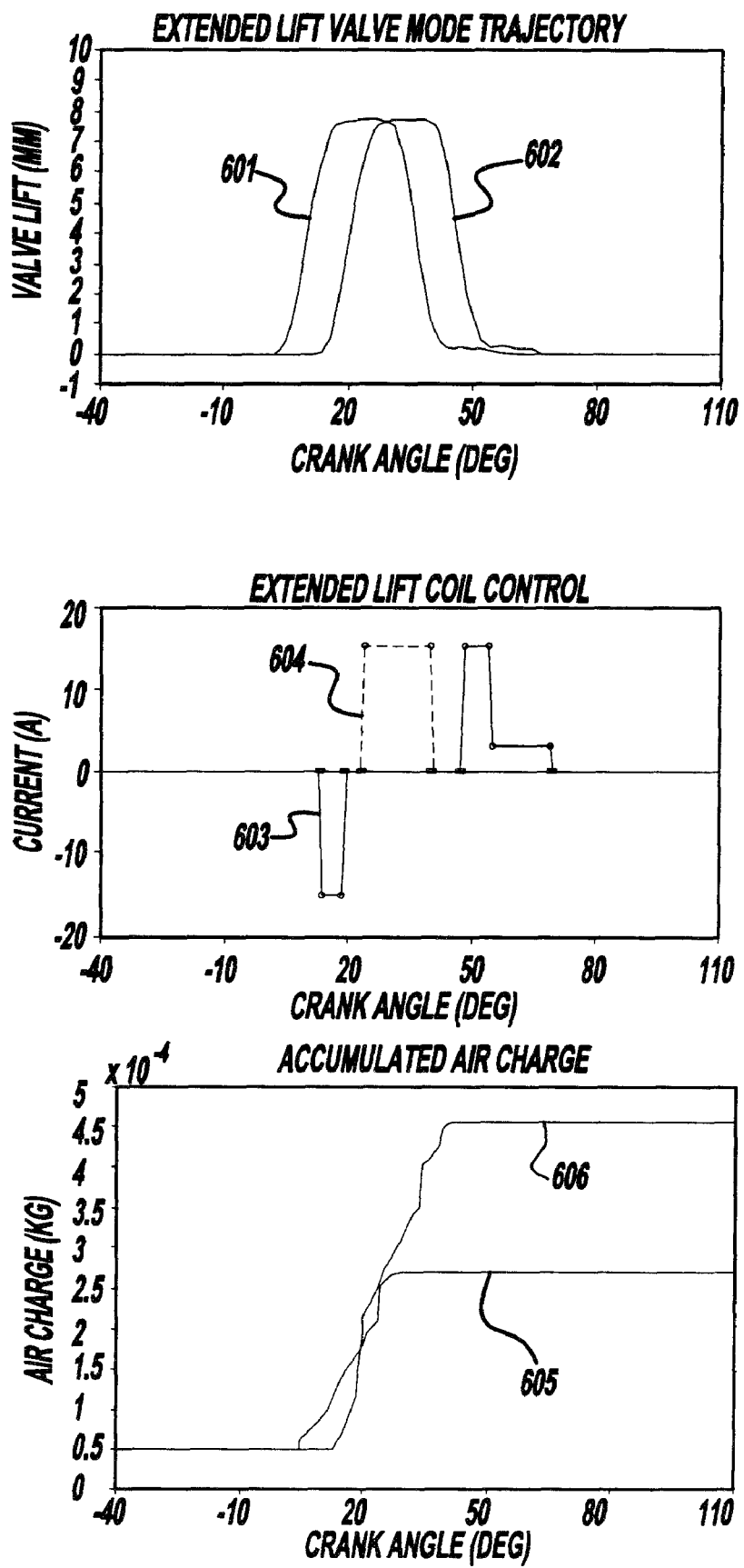
FIG. 6 is an example plot of simulation data that shows another valve trajectory for a valve operated in a hyper-ballistic valve mode.

On the other hand, a modified version of ballistic valve control, described herein as hyper-ballistic valve control, controls the position of the actuator armature and valve by adjusting current to the opening and closing coils without substantially capturing or holding the armature at or near the opening coil (i.e., the valve continues to move throughout the open valve duration). In this way, the valve trajectory (i.e., valve opening lift and duration) can be modified so that varying amounts of air are inducted by a cylinder. In one example, armature plate 207 can be released and/or repelled from a closed position by changing current direction or by reducing current flow to closing coil 205. Applying force to actuator armature 203, valve opening spring 201 can cause armature plate 207 to move away from closing coil pole face 224. As described above, this armature movement can cause valve 213 to lift off the valve seat and begin to open port 219. After being released and/or repelled, current can be controlled to the valve opening coil so that the armature may be attracted toward or repelled from the opening coil. By controlling the amount of current, timing of current delivery, and direction of current (i.e., controlling the electromagnet polarity) valve opening lift and duration can be controlled. In hyper-ballistic mode, the valve trajectory may not be defined solely by the valve closing coil current and the natural response of the valve, but it may also be determined by the magnetic field generated by the valve opening coil. The description of FIGS. 5 and 6 provide additional explanation for controlling a valve in hyper-ballistic mode.

Since ballistic mode and hyper-ballistic modes do not capture the valve in a substantially open position, these modes can be used during engine operating modes that use lower cylinder air charge amounts. For example, these modes may be used during idle, part-throttle, and during deceleration where cylinder air charge may be lower. These operating modes can reduce the valve opening time since the energy in the valve opening coil may not have to be reduced to allow a valve to close. In particular, it can take a finite amount of time to increase or decrease energy in a coil. By not capturing or holding a valve in an open position less energy may be delivered or extracted from a coil during valve operation. Consequently, it may take less time to extract or add energy to a coil so that the valve trajectory may be altered in a shorter period of time.

As an alternative, the valve actuator may be constructed of a single coil combined with a two plate armature. The valve lift, duration, and timing methods described herein may also be extended to this and other actuator designs since actuator designs are not intended to limit the scope of this description.

Figure 3:
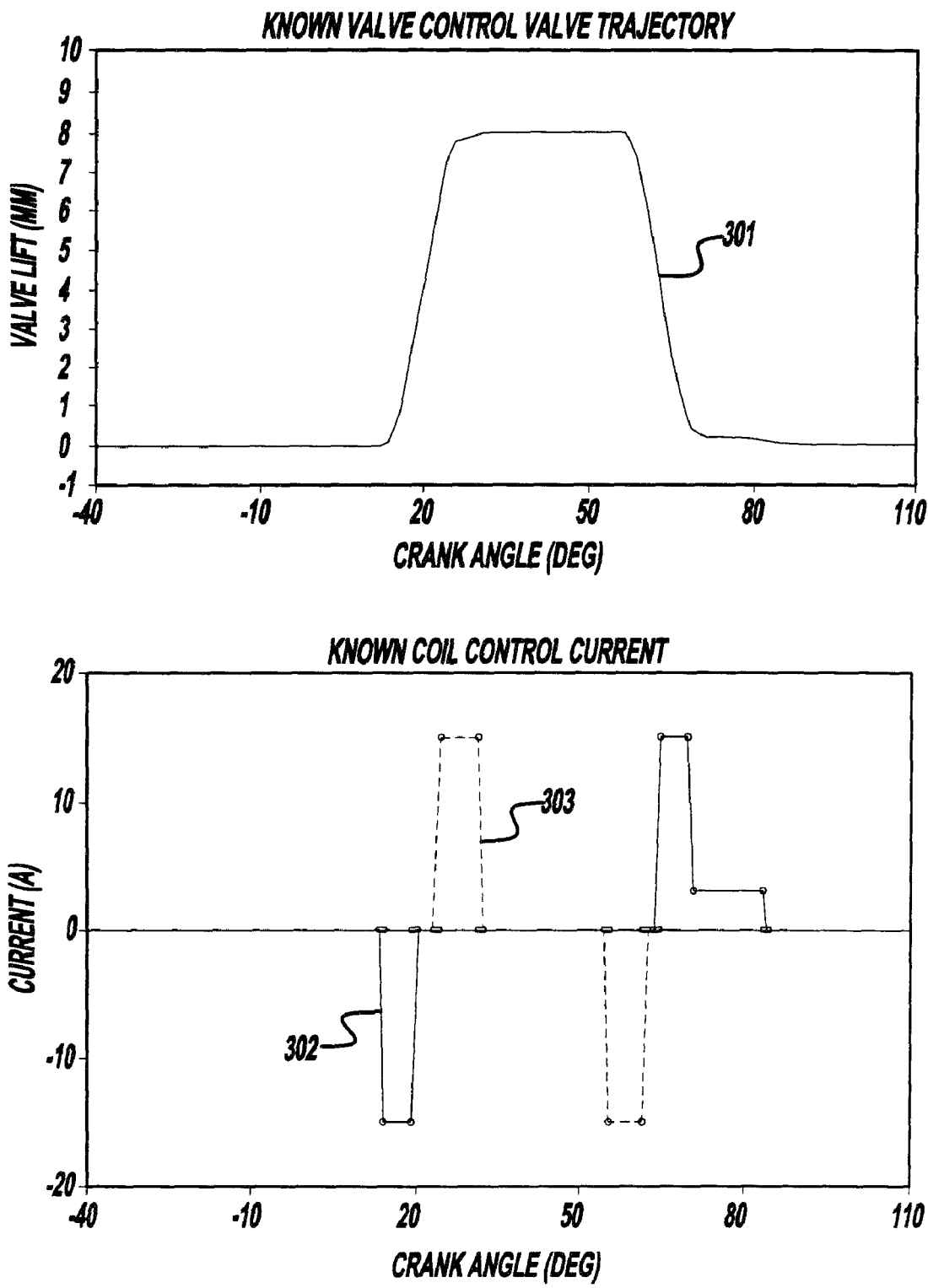
FIG. 3 is an example plot of simulation data that shows valve trajectories for a known valve control mode.

Referring to FIG. 3, an example plot of a simulation of a known electrically actuated valve control method is shown. The figure shows valve trajectory (position) and valve current during an intake cycle of a four-stroke cylinder, referenced to crankshaft angle (0° identifies top-dead-center (TDC) intake stroke). The valve lift profile curve 301 shows the intake valve opening at approximately 10° and closing at 70°. The slope of the valve curve is reduced as the valve approaches the closed position. This can reduce the valve noise and wear that may be associated with impacting the valve seat at increased velocity. During the valve opening phase, the valve moves from the closed position to the open position and is held stationary until the valve begins to close. Although the valve may be capable of traveling further than the full open position (8 mm in FIG. 3) the valve armature plate can limit the valve lift because of the opening coil, see FIG. 2 for an example armature and coil configuration.

The valve current delivered to the closing coil is described by curve 302 (solid line), while the opening coil current is described by curve 303 (dashed line). Currents 302 and 303 may be representative in terms of timing and amplitude, but the actual current amounts to control a valve as described by curve 301 may vary due to the non-linearity of magnetic force as an actuator armature approaches an electromagnet. In this example, the valve closing current 302 and the valve opening current 303 can be used to describe current control of an armature having permanent magnets. Each current profile is shown have positive and negative current. A positive current indicates that an attractive electromagnetic force may be produced between the electromagnet and the armature plate. On the other hand, a negative current indicates that a repulsive force may be produced between the electromagnet and the armature plate. The repulsive force can be used to launch the armature while the attractive force may be used to capture the armature. If an armature is used that does not contain permanent magnets, a holding current may be used to hold the valve open and/or closed. For non-permanent magnet armature plates, the valve can be released by reducing a holding current, thereby reducing the electromagnetic field that may be holding the armature in position.

Figure 7:
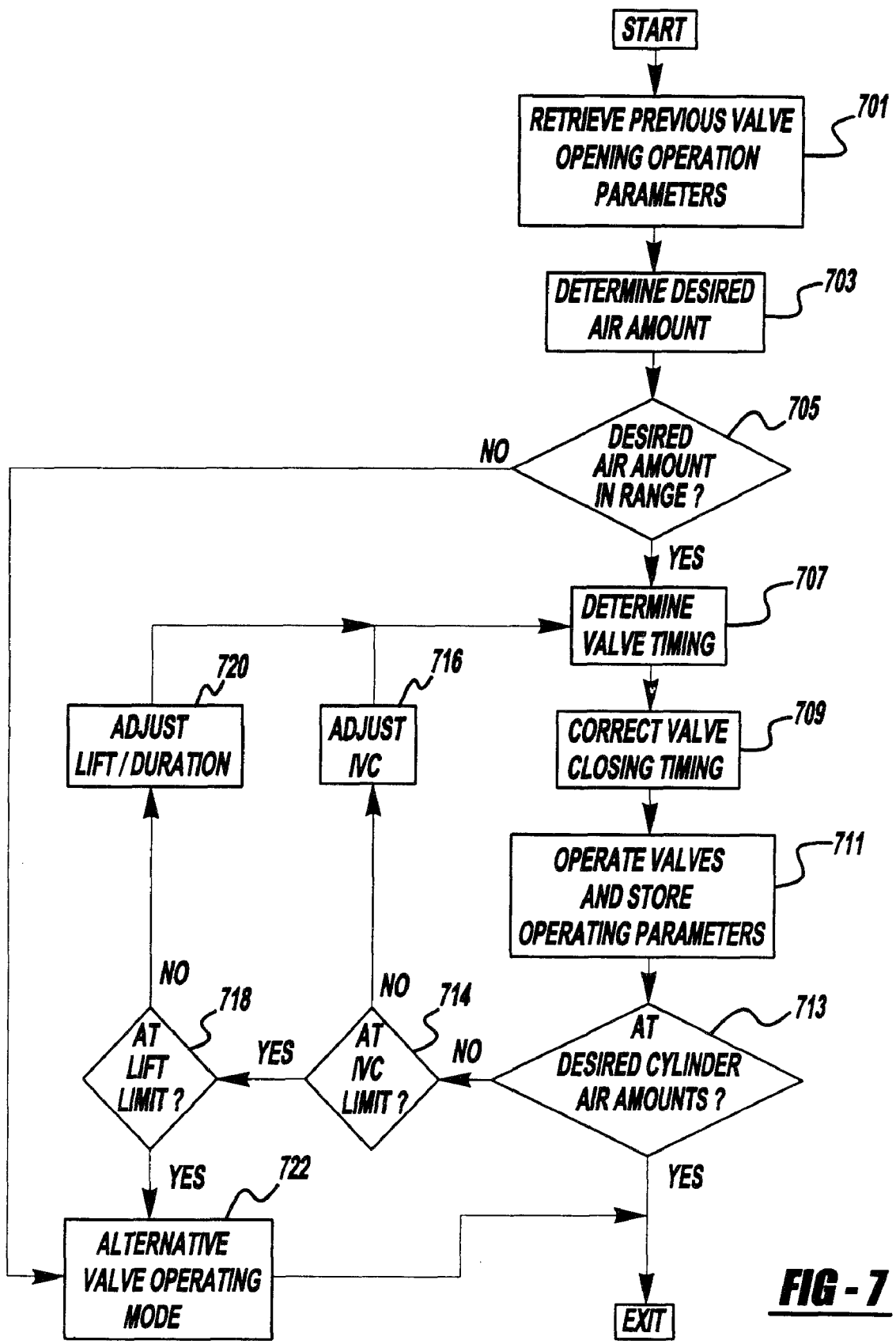
FIG. 7 is a flow chart of an example valve timing strategy.

This mode of operation may be one of a number of valve control options that are available in step 722 of FIG. 7.

Figure 4:
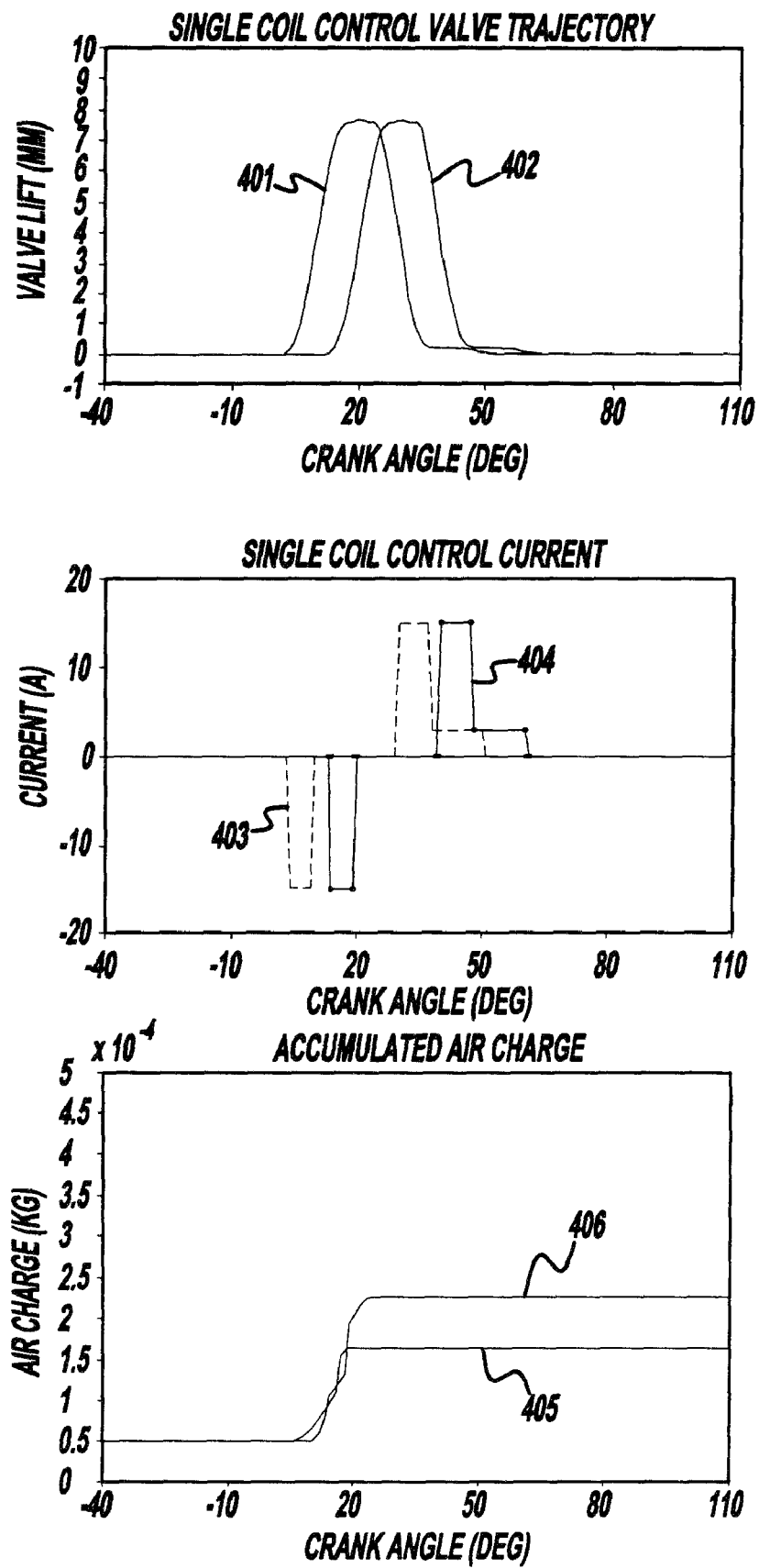
FIG. 4 is a plot of simulation data that shows example valve trajectories for valve controlled by a single coil.

Referring to FIG. 4, an example plot of simulation data of a valve trajectory for a valve operated by a single coil and for a phased single coil valve opening event. Each curve represents operation of a valve for a single induction event. The curves are shown together to illustrate differences in valve timing and to show the phase relationship between the curves. That is, the valve opening and closing times are shown for two different valve events so that a change in cylinder air charge can be explained. Valve profile curve 401 shows an example single coil controlled valve profile. Curve 402 shows a different single coil controlled valve profile that has been moved relative to crankshaft position (i.e., phased). The profiles are similar in amplitude and duration, however the valve response may vary as the valve release/repel location varies with respect to the crankshaft.

As described above, single coil control valve mode can be characterized by the release and/or repulsion of a valve from a closed position and the subsequently capture of the valve as the natural response of the valve apparatus causes the valve actuator armature to return toward the valve closing coil. In this mode of operation, only the closing coil is operated and as a consequence the valve may not reach a full open position, depending on the system response.

As mentioned above, the illustrated currents may be representative in terms of timing and amplitude, but actual current may vary due to the non-linearity of magnetic force as an actuator armature approaches an electromagnet. Armature coil control currents 403 and 404 represent the opening and closing coil currents for the valve trajectories 401 and 402 respectively. The valves are shown commanded similarly, but different commanded currents are possible (e.g., more or less current, changes in duration of current, and/or changes to current timing) since the valve release/repulse positions are different.

The advanced timing of single coil control profile 401 shows an intake valve closing (IVC) location that corresponds to a piston closer to the cylinder head. At this IVC position, the cylinder volume is smaller than the cylinder volume of the IVC location shown in the retarded ballistic profile curve 402. Changing IVC location can increase cylinder air charge as shown in cylinder air amount curves 405 and 406. Specifically, the cylinder air amount shown by curve 405, the advanced curve 405, begins to increase at the valve opening and continues to increase until the valve is closed. The cylinder air amount shown by curve 406, the retarded curve, also begins to increase at valve opening and continues to increase until the valve is closed. However, the total cylinder air amount depicted by the retarded valve timing, curve 406, is increased over the cylinder air amount shown in the advanced curve 405. The rate of change in cylinder air charge is higher for curve 406 because the piston position is lower in the cylinder and thus may provide additional vacuum in the cylinder. Furthermore, additional space for air may be provided since the cylinder volume can be increasing as the piston moves further through the intake stroke. Thus, curves 405 and 406 illustrate that the timing of a valve operated by single coil control can be used to change cylinder air amount. In general, the amount of air inducted into a cylinder can be increased by retarding single coil controlled valve timing and decreased by advancing single coil controlled valve timing, at least during some conditions.

A valve controlled by a single coil may or may not have permanent magnets in the armature plate. If permanent magnets are used current may be controlled to repel or attract an armature that is near a coil. If a non-permanent magnet armature is used the armature may be attracted to the coil. Therefore, the current used to control an actuator by a single coil can be different based on the actuator type and design.

This mode of operation may be used to adjust valve control during step 716 of FIG. 7. Furthermore, the method can be used when an electrically actuated valve is substantially closed (i.e., when the valve is in a position that does not permit flow through port 219).

Referring to FIG. 5, a plot of hyper-ballistic valve control variables is shown.

Hyper-ballistic valve trajectories can alter valve lift without capturing or holding the valve actuator armature at a substantially stationary position (e.g., ±0.5 mm) during a portion of the valve open region. As the actuator armature is released and/or repelled from proximity of the closing coil, current can be adjusted in the opening coil such that the natural response of the valve apparatus may be altered. In one example, current can be adjusted to the opening coil so that the peak valve lift approaches the fully open position. In another example, current can be adjusted to the opening coil so that the peak valve lift may be less than the valve lift amount of the natural valve response. In addition, the current in the open and/or closing coils may be used to extend the valve opening duration compared to single coil (ballistic) valve control.

Continuing with FIG. 5, two valve profiles are shown having a peak opening amount of approximately 6.5 mm. These valve profiles have durations and lift amounts that are less than (6.5 mm vs. 7.6 mm) the amount illustrated in FIG. 4 that shows conditions simulating a single coil controlled valve profile. Similar to FIG. 4, the two valve profiles are shown for two different events to illustrate different cylinder air amounts that may be produced. The valve profiles are similar in shape to one another, but the valve opening and closing locations are phased with respect to the crankshaft. The reduced amplitude can be produced by controlling the current in the valve opening coil so that the armature plate is repelled as it approaches the opening magnet, at least in some actuator designs. In other words, the opening electromagnet can be used to augment the closing spring force so that the force applied to the armature may be increased in the closing direction. Furthermore, the current may be used to increase the force applied to the armature in a non-linear manner. For example, the force applied to the armature by the coil may be a function of the square of the distance that the armature plate is from the actuator coil. This operating mode can be used in armatures with permanent magnets or in other actuator designs that can provide a repulsion force between the electromagnetic coils and the armature. In this way, electrically actuated valves can be controlled to produce varying amounts of valve lift and opening duration. Typically, the valve position moves throughout the valve trajectory. For example, the valve position can move open (increase) monotonically until the high lift location is reached, and the valve position can close (decrease) monotonically immediately after the high lift location is reached.

Valve current is shown for valve opening event 502. Valve closing coil current 503 is shown repelling and then attracting the armature 207. The opening coil current 504 provides a current that can act to repel a permanent magnet armature. This current may act to attract or repel the armature during a part or all of the valve opening duration so that the armature position is non-symmetrically controlled.

FIG. 5 also illustrates that valve opening and closing phasing may be used in conjunction with varying valve lift to provide additional degrees of freedom in controlling cylinder air amount. For example, curve 505 represents the amount of cylinder air amount inducted during a valve event having lift profile 501. The amount of air inducted can be reduced compared to the amount shown by curve 405 of FIG. 4. Depending on engine operating conditions, the reduced valve height can restrict air flow into the cylinder and may result in a lower cylinder air charge. However, curve 506 shows that the cylinder air amount may be increased, when the lift has been reduced, by moving the valve opening and closing positions with respect to the crankshaft position. Thus, curves 505 and 506 show that cylinder air amount can be adjusted by valve lift and timing. In addition, when the lift is adjusted the valve open duration often changes too.

Valves may be operated in this manner during steps 716 and 720 of FIG. 7.

Referring to FIG. 6, another plot of hyper-ballistic valve control variables is shown. Two valve trajectories approach the full valve open position (8 mm), but do not reach the full open position. In addition, the valve opening duration can be increased compared to the valve opening duration shown in FIG. 4 as the lift is increased. The curves are shown to illustrate the effect of valve timing on two different induction events. The valve trajectory curves 601-602 illustrate that the valve amplitude and duration may be increased without substantially capturing or holding the valve in the open position. Specifically, the valve trajectories monotonically increase until the high lift point and the valve can close by monotonically decreasing until the valve is closed, immediately thereafter. The valve trajectory also shows that the valve direction can reverse without the magnetic coil holding the valve at the full open valve lift location.

Valve trajectory 601 is shown in an advanced location, with respect to valve trajectory 602, to illustrate that valve opening and closing can be controlled simultaneously with valve lift.

Valve current is shown for valve opening event 602. Curve 603 illustrates current for the closing coil and curve 604 illustrates current for the opening coil. The current is shown going negative in the closing coil, between −10 and 20 crankshaft angle degrees, to show that the armature may be repulsed from the coil. The closing coil current is shown as positive, indicating an attractive force, between 40 and 75 crankshaft angle degrees. The opening coil current is shown as a positive current to illustrate that the armature is being drawn toward the opening coil. As mentioned above, the current in the opening coil may act to attract or repel the armature during a part or all of the valve opening duration so that the armature position is non-symmetrically controlled.

Curve 605 represents the amount of cylinder air inducted during a valve event having lift profile 601. The amount of air inducted is increased compared to the amount shown by curve 405 of FIG. 4. Depending on engine operating conditions, the increased valve height can improve air flow into the cylinder and may result in a higher cylinder air charge. However, curve 606 shows that the cylinder air amount may be further increased, when the lift has been increased, by moving the valve opening and closing positions with respect to the crankshaft position.

A valve controlled by two coils may or may not have permanent magnets in the armature plate. If permanent magnets are used current may be controlled to repel or attract an armature that is near a coil. If a non-permanent magnet armature is used the armature may be attracted to the coil. Therefore, the current used to control an actuator by a two coils can be different based on the actuator type and design.

Valves may be operated in this manner during steps 716 and 720 of FIG. 7.

Referring to FIG. 7, a flow chart of an example valve timing strategy is shown. In step 701, valve operating variables that can be stored in memory from a previous single coil controlled valve event and/or hyper-ballistic valve opening event can be recalled from memory. For example, intake valve open position, intake valve closing position, peak valve lift amount, engine temperature, valve actuator temperature, inducted cylinder air amount, manifold pressure, time since engine start, and the number of valve operations since power on can be recalled from memory. Each of the before-mentioned variables can be retrieved from unique memory locations that characterize valve operation at different engine speeds, loads, and valve release and/or repulsion locations (i.e., relative crankshaft position). In addition, engine speed, engine coolant temperature, air charge temperature, and air charge humidity can be retrieved from memory. After the parameters are recalled from memory the routine proceeds to step 703.

In step 703, desired cylinder air amount and exhaust gas recirculation (EGR) can be determined. In one example, operator demand (desired brake torque) can be determined by sensing pedal position sensor 119 and it may be converted to a desired brake torque. By knowing the current engine speed and operator demand, a desired cylinder air amount can be established from empirically determined tables or from regressed data. The method described in U.S. patent application Ser. No. 10/805,642 can be used to determine cylinder air charge and the application is hereby fully incorporated into this description by reference. Specifically, the method relates engine torque to individual cylinder pressure and uses a regression to determine an amount of fuel to be delivered to individual cylinders.

Cylinder pumping and friction losses of an active cylinder can be based on the following regression equations A and B:

$$PMEP_{Act} = C_0 + C_1 \cdot V_{IVO} + C_2 \cdot V_{EVC} + C_3 \cdot V_{IVC-IVO} + C_4 \cdot N \quad \text{Equation A}$$

Where $PMEP_{Act}$ is pumping mean effective pressure, $C_0$-$C_4$ are stored, predetermined, polynomial coefficients, $V_{IVO}$ is cylinder volume at intake valve opening position, $V_{EVC}$ is cylinder volume at exhaust valve closing position, $V_{IVC}$ is cylinder volume at intake valve closing position, $V_{IVO}$ is cylinder intake valve opening position, and N is engine speed. Valve timing locations intake valve open (IVO) and intake valve closed (IVC) are based on the last set of determined valve timings.

$$FMEP_{Act} = C_0 + C_1 \cdot N + C_2 \cdot N^2 \quad \text{Equation B}$$

Where $FMEP_{Act}$ is friction mean effective pressure, $C_0$-$C_2$ stored, predetermined polynomial coefficients, and N is engine speed.

Cylinder pumping and friction losses of a deactivated cylinder can be based on the following regression equations C and D:

$$PMEP_{Deact} = C_0 = C_1 \cdot N + C_2 \cdot N^2 \quad \text{Equation C}$$

Where $PMEP_{Deact}$ is friction mean effective pressure, $C_0$-$C_2$ are stored, predetermined polynomial coefficients, and N is engine speed.

$$FMEP_{Deact} = C_0 = C_1 \cdot N + C_2 \cdot N^2 \quad \text{Equation D}$$

Where $FMEP_{Deact}$ is friction mean effective pressure, $C_0$-$C_2$ are stored, predetermined polynomial coefficients, and N is engine speed.

The following describes further exemplary details for the regression and interpolation schemes. One dimensional functions are used to store friction and pumping polynomial coefficients for active and inactive cylinders. The data taken to determine the coefficients are collected at a sufficient number of engine speed points to provide the desired torque loss accuracy. Coefficients can be interpolated between locations where no data exists. For example, data can be collected and coefficients can be determined for an engine at engine speeds of 600, 1000, 2000, and 3000 RPM. If the engine is then operated at 1500 RPM, coefficients from 1000 and 2000 RPM can be interpolated to determine the coefficients for 1500 RPM. Total friction losses can then determined by at least one of the following equations:

$$FMEP_{total} = \frac{\left[\begin{array}{c} Numcyl_{Act} \cdot FMEP_{Act} + \\ Numcyl_{Dact} \cdot FMEP_{Dact}(t_{deact}) \end{array}\right]}{Numcyl_{total}} \quad \text{or}$$

$$FMEP_{total} = Modfact \cdot FMEP_{Act} + (1 - Modfact) \cdot FMEP_{Deact}$$

Where $Numcyl_{Act}$ is the number of active cylinders, $Numcyl_{Dact}$ is the number of deactivated cylinders, Modfact is the ratio of the number of active cylinders to total number of cylinders, and $FMEP_{total}$ is the total friction mean effective pressure. Total pumping losses can be determined by one of the following equations:

$$PMEP_{total} = \frac{\left[\begin{array}{c} Numcyl_{Act} * PMEP_{Act} + \\ Numcyl_{Dactt} * PMEP_{Dact}(t_{deact}) \end{array}\right]}{Numcyl_{total}} \quad \text{or}$$

$$PMEP_{total} = Modfact \cdot PMEP_{Act} + (1 - Modfact) \cdot PMEP_{Dact}$$

Where $Numcyl_{Act}$ is the number of active cylinders, $Numcyl_{Dact}$ is the number of deactivated cylinders, Modfact is the ratio of the number of active cylinders to total number of cylinders, and $PMEP_{total}$ is the total pumping mean effective pressure. Additional or fewer polynomial terms may be used in the regressions for $PMEP_{Act}$, $PMEP_{Deact}$, $FMEP_{Act}$, and $FMEP_{Deact}$ based on the desired curve fit and strategy complexity.

The losses based on pressure can be transformed into torque by the following equations:

$$\Gamma_{friction\_total} = FMEP_{total} \cdot \frac{V_D}{4 \cdot \pi} \cdot \frac{N/m^2}{(1 \cdot 10^{-5} \text{ bar})}$$

$$\Gamma_{pumping\_total} = PMEP_{total} \cdot \frac{V_D}{4 \cdot \pi} \cdot \frac{N/m^2}{(1 \cdot 10^{-5} \text{ bar})}$$

Where $V_D$ is the displacement volume of active cylinders. Then, indicated mean effective pressure (IMEP) for each cylinder can be determined, for example via the equation:

$$IMEP_{cyl}(\text{bar}) = \left(\frac{\Gamma_{brake} - \left(\begin{array}{c} \Gamma_{friction\_total} + \Gamma_{pumping\_total} + \\ \Gamma_{accessories\_total} \end{array}\right)}{Numcyl_{total}}\right) * \frac{4\pi}{V_D} * \frac{(1 * 10^{-5} \text{ bar})}{N/m^2} \cdot SPKTR$$

Where $Num\_cyl_{Act}$ is the number of active cylinders, $V_D$ is the displacement volume of active cylinders, SPKTR is a torque ratio based on spark angle retarded from minimum best torque (MBT), i.e., the minimum amount of spark angle advance that produces the best torque amount. Additional or fewer polynomial terms may be used in the regression based on the desired curve fit and strategy complexity. Alternatively, different estimation formats can also be used. The term SPKTR can be based on the equation:

$$SPKTR = \frac{\Gamma_{\Delta SPK}}{\Gamma_{MBT}}$$

Where $\Gamma_{\Delta SPK}$ is the torque at a spark angle retarded from minimum spark for best torque (MBT), $\Gamma_{MBT}$ is the torque at MBT. In one example, the actual value of SPKTR can be determined from a regression based on the equation:

$$SPKTR = C_0 + C_1 * \Delta_{spark}^2 + C_2 * \Delta_{spark}^2 * N + C_3 * \Delta_{spark}^2 * IMEP_{MBT}$$

Where $C_0$-$C_3$ are stored, predetermined, regressed polynomial coefficients, N is engine speed, and $IMEP_{MBT}$ is IMEP at MBT spark timing. The value of SPKTR can range from 0 to 1 depending on the spark retard from MBT.

Individual cylinder fuel mass can be determined, in one example, for each cylinder by the following equation:

$$m_f = C_0 + C_1 * N + C_2 * AFR + C_3 * AFR^2 + C_4 * IMEP + C_5 * IMEP^2 + C_6 * IMEP * N$$

Where $m_f$ is mass of fuel, $C_0$-$C_6$ are stored, predetermined, regressed polynomial coefficients, N is engine speed, AFR is the air-fuel ratio, and IMEP is indicated mean effective pressure. As indicated previously, additional or fewer polynomial terms may be used in the regression based on the desired curve fit and strategy complexity. For example, polynomial terms for engine temperature, air charge temperature, and altitude might also be included.

A desired air charge can be determined from the desired fuel charge. In one example, a predetermined air-fuel mixture (based on engine speed, temperature, and load), with or without exhaust gas sensor feedback, can be used to determine a desired air-fuel ratio. The determined fuel mass from above can be multiplied by the predetermined desired air-fuel ratio to determine a desired cylinder air amount. The desired mass of air can be determined from the equation:

$$m_a = m_f AFR$$

Where $m_a$ is the desired mass of air entering a cylinder, $m_f$ is the desired mass of fuel entering a cylinder, and AFR is the desired air-fuel ratio.

In addition, EGR can be determined by indexing a table containing empirically determined EGR amounts. The specific values of table entries are based on engine emissions, combustion stability, and fuel economy. Furthermore, the table can be indexed by engine speed, engine temperature, and cylinder load. The routine then proceeds to step 705.

In step 705, a decision to perform single coil controlled, hyper-ballistic, or an alternate valve control is made. The cylinder air amount determined from step 303 is compared to a range of cylinder air amounts that may be available using single coil controlled (i.e., using a single coil of a dual coil actuator or using the coil of a single coil dual plate actuator) to control a valve or or hyper-ballistic valve modes, at the present engine speed. In addition, since the cylinder air amount can be a function of available cylinder volume and EGR amount, the EGR amount determined in step 303 can be used to determine if the combined EGR amount and cylinder air amount are possible in single coil controlled or hyper-ballistic mode. For example, since a valve operated in single coil controlled or hyper-ballistic mode may not be captured or held substantially motionless by an opening magnetic coil; there may be limited control over the valve opening duration. Consequently, the amount of intake and exhaust valve overlap may be limited at an engine operating condition because the cylinder may not be able to hold the desired EGR and air charge since there may be limited control over the intake valve opening duration. If the desired cylinder air amount and EGR amount is not within the single coil controlled or hyper-ballistic timing range or if single coil controlled or hyper ballistic mode control is not desirable based on other engine operating conditions (e.g., engine temperature, barometric pressure, and time since start) the routine proceeds to step 712. Otherwise, the routine proceeds to step 707.

At step 707, valve timing for single coil controlled mode or hyper-ballistic mode can be determined. In one example, desired cylinder air amount and EGR amount can be retrieved from step 703, providing a basis for intake and exhaust valve timing. Valve timing can be determined in accordance with U.S. Pat. No. 6,850,831 which is hereby fully incorporated by reference. The volume at IVC for the desired mass of air entering a cylinder can be described by the following equation:

$$V_{a,IVC} = \frac{m_a}{\rho_{a,IVC}}$$

Where $\rho_{a,IVC}$ is the density of air at IVC, $V_{a,IVC}$ is the volume of air in the cylinder at IVC. The density of air at IVC can be determined by adjusting the density of air to account for the change in temperature and pressure at IVC by the following equation:

$$\rho_{a,IVC} = \rho_{amb} \cdot \frac{T_{amb}}{T_{IVC}} \cdot \frac{P_{IVC}}{P_{amb}}$$

Where $\rho_{amb}$ is the density of air at ambient conditions, $T_{amb}$ is ambient temperature, $T_{IVC}$ is the temperature of air at IVC, $P_{IVC}$ is the pressure in the cylinder at IVC, and $P_{amb}$ is ambient pressure. In one example, when IVC occurs before bottom-dead-center (BDC) pressure in the cylinder at IVC can be determined by differentiating the ideal gas law forming the following equation:

$$\dot{P}_{IVC} = \frac{\dot{m}_{cyl} \cdot R \cdot T - P_{IVC} \cdot \dot{V}}{V}$$

Where $P_{IVC}$ is cylinder pressure, V is cylinder volume, R is the universal gas constant, and $\dot{m}$ is flow rate into the cylinder estimated by:

$$\dot{m}_{cyl} = \frac{C_D \cdot A_{valve}(\Theta) \cdot P_{run}}{\sqrt{R \cdot T}} \cdot \left(\frac{P_{cyl}}{P_{run}}\right)^{\frac{1}{\gamma}} \cdot \sqrt{\frac{2 \cdot \gamma}{\gamma - 1} \cdot \left(\frac{P_{IVC}}{P_{run}}\right)^{\frac{\gamma-1}{\gamma}}}$$

Where $C_D$ is the valve coefficient of discharge, $A_{valve}(\theta)$ is effective valve area as a function of crankshaft angle $\theta$, $P_{run}$ is the manifold runner pressure which can be assumed as manifold pressure at lower engine speeds, and $\gamma$ is the ratio of specific heats. $C_D$ is calibratible and can be empirically determined.

The effective valve area, $A_{valve}(\theta)$, can vary depending on the valve mode (e.g., single coil controlled or hyper-ballistic), the amount and timing of opening and/or closing coil current (used to describe a change in lift profile), the closing coil release and/or repulsion location (measured relative to crankshaft position), and the engine speed. In one example, the valve lift can be described for single coil controlled and hyper-ballistic operation by using the equation of a polynomial:

$$f(x) = ax^4 + bx^3 + cx^2 + dx + e$$

Where the coefficients a-e may be obtained by fitting a recorded trajectory of a single coil controlled valve profile to the polynomial. Parameterization of the coefficients can be use to modify the base polynomial into the desired form so that hyper-ballistic and other operational variations may be described. For example, the trajectory of a single coil controlled valve can be captured at a selected engine speed and a selected valve release and/or repulsion location (e.g., 20 crank angle degrees after TDC intake stroke). The recorded data can be fit to an equation that describes a polynomial or alternately another function. Further, the coefficients that describe the basic form of the polynomial can be modified so that the height and/or width of the basic polynomial changes from the curve that describes the original ballistic profile. The coefficients may be stored at selected intervals that may depend on engine operating conditions such as engine speed, valve release location, and engine temperature.

The valve lift profile can be combined with the valve dimensions to estimate the effective area, $A_{valve}(\theta)$, via the following equation:

$$A_{valve}(\Theta) = L(\Theta) \cdot 2 \cdot \pi \cdot d$$

Where $L(\theta)$ is the valve lift amount determined from the above-mentioned polynomial as a function of crankshaft angle $\theta$, and d is the valve seat diameter.

The volume of air at IVC can be determined from the following equation:

$$V_{a,IVC} = f_{air} \cdot V_{i,IVC} + (1 - F_e) \cdot V_{r,IVC}$$

Where $f_{air}$ is the proportion of air in the intake mixture and $F_e$ is the fraction of burned gas in the exhaust manifold that can be determined by methods described in literature. For stoichiometric or rich conditions $F_e$ can be set equal to one. Fair can be determined from:

$$f_{air} = \frac{1}{1 + \frac{1}{AFR} + F_i}$$

Where AFR is the air fuel ratio and $F_i$ is the fraction of burned gas in the exhaust manifold. $F_i$ can be estimated by methods described in literature. The volume occupied by the intake mixture at IVC can be determined by the equation:

$$V_{i,IVC} = V_{IVC} + V_{cl} - V_{r,IVC}$$

Where $V_{cl}$ is the cylinder clearance volume, $V_{r,IVC}$ is the residual volume at IVC, and $V_{IVC}$ is the total cylinder volume at IVC. The residual volume at IVC can be empirically determined as a percentage of the total cylinder volume and stored in a function or table that may be indexed by engine speed and desired torque, for example. Typically, the percent EGR can be expressed as a mass fraction of the total cylinder air and exhaust (residual) mass, and may be based on emissions, fuel economy, and/or combustion stability. The molecular weight of exhaust and air can be assumed nearly equal so that $V_{r,IVC}$ can be expressed by:

$$V_{r,IVC} = EGR\% \cdot (V_{IVC} + V_{cl})$$

Where EGR% is a predetermine percentage of desired EGR in a cylinder (e.g., 0-25%). Substituting into the intake mixture volume equation from above yields:

$$V_{i,IVC} = V_{IVC} + V_{cl} - EGR\% \cdot (V_{IVC}) - EGR\% \cdot (V_{cl})$$

Solving for $V_{IVC}$ yields:

$$V_{IVC} = \frac{V_{i,ICVC} - V_{cl}(1 - EGR\%)}{(1 - EGR\%)}$$

The cylinder volume minus the clearance volume at IVC can then be used to determine intake valve closing position by solving the following equation for $\theta$:

$$V_{\Theta} = \frac{\pi B^2}{4} \left[ r + C - \left( C \cdot \cos\Theta + \sqrt{r^2 - C^2 \cdot \sin^2\Theta} \right) \right]$$

Once the IVC location is determined, the polynomial equation describing valve trajectory from above can be used to solve for the IVO location. In this way, IVC is determined by accounting for EGR and desired air amount.

Alternatively, IVC position and valve opening duration may be considered to be a function of the valve release and/or repulsion point (i.e., the crankshaft angle where the armature is released and/or repulsed from the closing coil), engine speed, and of the natural response of the valve since the actuator armature may not be controlled by the valve opening coil. By using empirically determined IVC locations and engine speed to index a function or table, the valve release point (IVO) can be determined. For example, if engine speed is 800 RPM and a desired IVC is 40 crank angle degrees after TDC intake stroke, a predetermined IVO location can be determine by indexing a table based on engine speed and desired IVC. The tables or functions may be constructed to provide a desired level of resolution so that engine operating points that are between memorized data can provide a desired level of table output resolution.

After determining IVC and IVO, the volume occupied by residual gas at IVC can be described by:

$$V_{r,IVC} = ERG\% \cdot (V_{IVC} + V_{cl}) = \frac{T_{IVC}}{T_{exh}} \cdot \frac{P_{exh}}{P_{IVC}} \cdot (V_{r,EVC} + V_{cl})$$

Where $T_{IVC}$ is the temperature at IVC that may be approximated by a regression of the form $T_{IVC} = f(N, m_f, \theta_{OV})$ Where N is engine speed, $m_f$ is fuel flow rate, and $\theta_{OV}$ valve overlap. $T_{exh}$ is temperature in the exhaust manifold, $P_{exh}$ is pressure in the exhaust manifold, $V_{cl}$ is cylinder clearance volume, $P_{IVC}$ is pressure in the cylinder at IVC, and $V_{r,EVC}$ is the residual volume at EVC. In one example, where IVO is before EVC and where EVC and IVO are after TDC, $V_{r,EVC}$ can be described by:

$$V_{r,EVC} = \int \frac{A_e(\Theta)}{A_i(\Theta) + A_e(\Theta)} dV(\Theta)$$

Where the integral is evaluated from IVO to EVC, and where $A_i$ and $A_e$ are the effective areas of the intake and exhaust valves for $\theta \in (\theta_{IVO}, \theta_{EVC})$. Thus, the before-mentioned valve trajectory describing polynomials can be evaluated from the previously determined IVO location to a EVC location that delivers the desired residual cylinder volume $V_{r,EVC}$.

EVO may be determined experimentally and stored into memory as a function of engine operating parameters such as engine speed, cylinder load, engine temperature, and ambient air humidity. The routine continues to step 709.

Note: exhaust valves may also be controlled by a single coil. However, since exhaust pressure may have to be overcome during valve opening, the range of valve control may be limited. Further, current may be controlled to a coil by controlling the direction of current flow through the coil such that the coil can attract or repel the actuator armature.

In step 709, single coil controlled valve timing can be corrected. By operating the closing coil of a valve controlled in a mode where the opening coil is not activated during a cycle of the cylinder to capture the valve in an open and closed position, the valve closing coil current may be adjusted in response to a previous valve opening and closing cycle to adjust cylinder air charge. For example, the closing coil of an electrically actuated valve can be operated to release or repel the actuator armature so that the valve opens. During the valve opening trajectory, current to the valve closing coil can be controlled after a predetermined period, or alternatively based on a sensor signal, to close the valve at a first position, relative to the crankshaft. Subsequent operation of the closing coil to release the valve may be varied as the position of the previous valve closing varies. In this way, control of a valve closing coil may be adjusted in response to the previous valve closing event.

A single coil controlled profile can be considered to be symmetric in shape due to the application of downward force on the valve due to the injection of air charge at intake valve opening (IVO) and the combination of mechanical and/or electrical force applied to the valve to initiate the lift. Further, pushback (i.e., air and exhaust gases that are pushed from the cylinder into the intake manifold while an intake valve is open) that can be caused by late intake valve closing can be considered negligible at many intake valve timings. Therefore, single coil controlled valve timing can be characterized by two parameters: IVO and $P_1$ and where $P_1$ can be defined as the peak valve lift crankshaft angle. The peak lift crankshaft angle can be the angle at which peak lift of the valve in single coil control is measured. Given these parameters an equation can be written for an estimate of intake valve closing ($IVC_{est}$) for the valve.

$IVC_{est} = IVO + 2*(P_1 - IVO)$

The error, e, between an estimated IVC and a desired IVC can be written as the following equation:

$e = IVC - IVC_{est} = IVC - IVO - 2*(P_1 - IVO).$

An equation for a subsequent intake valve opening can be formed based on a previous intake valve closing, such as:

$IVO(i+1) = IVO(i) + \alpha*e(i) = IVO(i) + \alpha*(IVC(i) - IVO(i) - 2*(P_1(i) - IVO(i)))$ where i is an event counter and $\alpha$ is a constant in the range $\alpha \in (0,1]$. The constant $\alpha$ can be used to slew to the adjusted timing over multiple cycles. From this equation, a desired IVO can be selected to yield the desired IVC.

Hyper-ballistic mode valve timing can also be corrected by using the before-mentioned single coil control correction and an additional correction for the current supplied to the opening coil. In one example, the valve lift can be measured and then compared to a desired valve lift amount. Then, by subtracting the actual valve lift from the desired valve lift a valve lift error can be generated. The error or a proportion of the error can be used to index a table or function that provides a current adjustment to the valve opening coil. This approach can reduce the valve lift error and can compensate for both positive and negative valve lift errors.

In step 711, valves are operated in single coil control or hyper-ballistic mode. Specifically, the valves are released and/or repulsed from respective closing coils, opening the valve without substantially capturing or holding the valve actuator armature by an opening magnet, and as the armature approaches the closing coil the valve can be set to a closed position. In addition, during the intake event, valve operating parameters can be monitored and stored into memory for subsequent valve timing error corrections. For example, stored parameters may include inducted air amount, valve opening position, valve lift height, valve closing position, valve current, and manifold pressure. The latest valve operating parameters may be used to modify nominal parameters that were initially programmed into the controller memory. Then the routine proceeds to exit.

Note: it is not necessary for all intake valves of the engine to be actuated in a single coil control mode. For example, a fraction of the total number of cylinders may operate valves in a single coil control mode while others may operate valves in two coil mode. Alternatively, different intake valves may operate in different modes in a single cylinder, one intake valve in single coil control mode and another in a two coil mode for example.

In step 711, valves are operated by capturing or holding a valve and/or armature substantially motionless during a portion of a cylinder cycle by both the opening and closing coils. That is, the valves may be held in full open, full closed, levitated open (i.e., levitation is a position where the armature may be suspended near a actuator coil, using electromagnetic energy, while the valve may be open or closed), and/or levitated closed. Since the desired cylinder air amount may be out of single coil control or hyper-ballistic timing range, the opening and closing coils are used to open and close valves from full open to full closed positions at a desired open duration. In this mode, valve timing may be determined geometrically, as described in step 707, or by another method to induct the desired air amount determined in step 703. The valve commands are sent to controllers that actuate valves in respective cylinders, then routine proceeds to step 713.

In step 713, the routine determines if the valve timing has delivered the desired cylinder air amount. In one example, an air meter in the intake system may be used to determine the air inducted into respective cylinders as described by U.S. Pat. No. 5,331,936 which is hereby fully incorporated by reference. Alternatively, a manifold pressure transducer or feedback from valve position sensors may be used to determine if a desired air amount has been inducted from the valve commands of step 711. Specifically, a base individual cylinder air amount can be calculated using the well-known ideal gas law equation PV=mRT. The ideal gas equation, written for a four-cylinder engine compensated for operating conditions is as follows:

$$Mcyl = \frac{D}{4RT} \cdot \eta(N, \text{load}) \cdot P_m \cdot FNBP(BP) \cdot FNTEM(ECT, ACT)$$

Where Mcyl is the engine air amount or cylinder air charge, D is the displacement of the engine, R is the gas constant, T is the engine air temperature. The symbol $\eta$ represents the engine volumetric efficiency, empirically determined, stored in a table with indices of engine speed and load. Manifold pressure, Pm can be based on measuring a signal from pressure transducer 122.

If the inducted air amount is equal to the desired air amount the routing proceeds to exit. Alternatively, a dead band may be constructed around the desired air amount such that if the inducted air amount is within a predetermined region of the desired air amount the routine also exits. However, if the inducted air amount deviates from the desired air amount the routine proceeds to step 714.

In step 714, the routine determines if IVC is at a limit of adjustment. Depending on the valve operating mode (e.g., single coil controlled or hyper-ballistic), IVC locations may be limited to a specific operating window. For example, IVC locations later than BDC may result in air charge amounts that are below an amount necessary for combustion. Consequently, boundary limits can be used to limit the IVC location during single coil control and hyper-ballistic valve operating modes. Further, the IVC limits may be based on crankshaft referenced locations and/or engine operating conditions that provide locations of high or low air charge amounts, engine speed for example. If the current valve timing is at an IVC limit then the routine proceeds to step 718, otherwise the routine proceeds to step 716.

In step 716, IVC timing is adjusted. In one example, feedback from an air mass sensing device may also be used to correct single coil control or hyper-ballistic mode valve operation. For example, an error signal may be produced by subtracting an actual inducted air mass from the desired inducted air mass. This error amount or a proportion of the error amount can then be added to the desired air amount, from step 703, to compensate for any differences between the desired and actual inducted air amount. One effect of changing the desired air amount may be that the inducted air amount is changed by retarding or advancing the valve opening position, relative to a crankshaft position. Another effect may be that air amount is changed by increasing or decreasing valve lift (step 720), and/or by increasing or decreasing the valve opening duration (step 720). Furthermore, look-up functions or tables based on the air charge error can be used to modify desired air amount by adjusting the desired air amount as a function of the desired air amount error. In addition, adjustments may be made during a single intake stroke or they may be incrementally moved over the course of a number of intake events. Also, the before-mentioned air mass sensing device can be a mass air meter or a manifold pressure transducer. Alternatively, a combination of the two sensors may also be used. The routine proceeds to step 707.

In step 718, the routine determines if valve lift and/or open duration is at a limit of adjustment. Valve lift control actions may be limited to a specific operating window. For example, engine operating conditions (e.g., speed, load, temperature, etc.) and/or the valve IVC location may result in air charge amounts that are below an amount necessary for combustion. Consequently, boundary limits can be used to limit the valve lift and/or opening duration during hyper-ballistic valve operating mode. Further, the valve lift and/or open duration limits may be based on crankshaft referenced locations and/or engine operating conditions that provide locations of higher or lower air charge amounts. If the current valve lift is at a limit then the routine proceeds to step 722, otherwise the routine proceeds to step 720.

The path from step 713 to step 714, and then to step 718 can cause valve adjustments to first modify the valve opening position and then to adjust valve lift and/or opening duration. However, it is also possible to first adjust valve lift and/or opening duration and then adjust the valve opening position. Alternatively, valve lift and/or duration and valve timing may be adjusted simultaneously.

In step 720, valve lift and/or opening duration can be adjusted. By controlling current to the opening coil valve lift and/or valve opening duration may be adjusted. By controlling the amount and direction of current in the opening coil, a permanent magnet actuator armature can be attracted or repelled. If a lift amount greater than that available from controlling a single coil is desired the opening coil may be used to attract and control the valve lift to an amount between a full open amount and a single coil controlled valve event amount. By controlling the current in the opening coil the lift amount can be varied. Typically, the valve duration may be affected by adjusting the valve lift amount. In addition, the valve lift amount may be controlled to an amount that is less than that achieved by controlling a valve with a single coil. For example, an armature plate of an electrically actuated valve can be moved so that the valve is moved from and closed position to an open position by adjusting current flow to the closing coil. During the valve opening the valve lift can be controlled by adjusting current flow to the opening coil to attract or repel the armature plate. By controlling current to the opening coil a magnetic repulsion force may be created by the opening coil against a permanent magnet armature plate. The repulsing force can be used in conjunction to the closing spring force to control the valve lift amount. Furthermore, the valve lift amount can be controlled by adjusting current flow to the valve opening coil in response to engine operating conditions so that as operating conditions vary the valve lift amount varies.

Continuing with step 720, similar to step 716, an air mass sensing device may be used to correct valve lift in step 720. An error signal may be produced by subtracting an actual inducted air mass from the desired inducted air mass. This error amount or a proportion of the error amount can then be added to the desired air amount, from step 703, to compensate for any differences between the desired and actual inducted air amount. In addition, look-up functions or tables based on the air charge error can be used to modify desired air amount by adjusting the desired air amount as a function of the desired air amount error. The routine proceeds to step 707.

It is also possible to adjust valve lift and IVC in response to engine speed. For example, at one engine operating speed valve lift amount may be restricted to a predetermined value, but at another engine speed the valve lift amount may be restricted to a different amount. This alternative strategy can be used to control valve lift and IVC taking into account changes in engine breathing that may occur at different engine speeds.

In another embodiment it is possible to time the end of injection with the adjusting IVC location. Alternatively, injection timing can be scheduled so that a portion of fuel injects on a closed valve and the remainder injects on an open valve. The injection options are available by linking the fuel injection location to the determined IVC.

In step 722, an alternate valve operating mode can be selected. In one example, a valve operating mode can be selected that captures and holds the valve substantially motionless for a portion of a cylinder cycle. This mode can be a typical electrically actuated valve mode since valve opening and closing can be controlled with respect to crankshaft position. For example, an intake valve can be held closed for 580 crankshaft degrees and then held open for the remaining 140 crankshaft degrees that make up a four-stroke combustion cycle. The routine proceeds to exit.

As will be appreciated by one of ordinary skill in the art, the routines described in FIG. 7 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to adjust timing of an electrically actuated valve, said electrically actuated valve operating in a cylinder of an internal combustion engine, the method comprising:
    during a cycle of said cylinder, opening said electrically actuated valve at a first valve opening position without activating a valve opening coil, and closing the valve at a first closing position; and
    during a second subsequent cycle of said cylinder, opening said electrically actuated valve at a second opening position that is varied based on the crankshaft angle at which a first closing occurs, where the second opening position is increased as the said crankshaft angle at which the first closing occurs increases.

2. The method of claim 1 wherein said first closing position is determined from a signal of a sensor.

3. The method of claim 1 wherein between said first opening and first closing said electrically actuated valve, a valve closing electromagnet is de-energized and then energized after a integral number of oscillations of a valve armature between said valve closing electromagnet and a valve opening electromagnet.

4. The method of claim 1 further comprising varying of said second opening position of said electrically actuated valve in response to a sensor signal.

5. The method of claim 4 wherein said sensor signal is indicative of a cylinder air charge amount.

6. The method of claim 1 wherein said electrically actuated valve is an intake valve.

7. The method of claim 1 wherein said electrically actuated valve is an exhaust valve.

8. The method of claim 1 wherein between said first opening and first closing said electrically actuated valve, a closing coil repels then attracts an actuator armature that acts on said electrically actuated valve.

9. A method to adjust timing of an electrically actuated valve, said electrically actuated valve operating in a cylinder of an internal combustion engine, the method comprising:
    operating a closing coil of said electrically actuated valve when said electrically actuated valve is in a substantially closed position;
    opening said electrically actuated valve without actuating an opening coil of said electrically actuated valve in a first cylinder cycle;
    operating said closing coil after a predetermined period to close said electrically actuated valve at a first position; and
    opening said electrically actuated valve during a second cylinder cycle, said second cylinder cycle subsequent to said first cylinder cycle, without actuating an opening coil of said electrically actuated valve, at a position that is based on the crankshaft angle at which a closing occurred, where the position of the opening of the electrically actuated valve during the second cylinder cycle is increased as the crankshaft angle at which said closing occurred is increased.

10. The method of claim 9 wherein said electrically actuated valve is an intake valve.

11. The method of claim 9 wherein said electrically actuated valve is an exhaust valve.

12. The method of claim 11 wherein said sensor signal is indicative of a cylinder air charge amount.

13. The method of claim 9 wherein the opening position of said electrically actuated valve varies based on a sensor signal.

14. The method of claim 13 wherein said operating a closing coil of said electrically actuated valve when said electrically actuated valve is in a substantially closed position acts to allow said electrically actuated valve to move to an open position.

15. The method of claim 13 wherein said operating said closing coil of said electrically actuated valve varies based on said sensor signal.

16. A non-transitory computer readable storage medium having stored data representing instructions executable by a computer to control an electrically actuated valve in a cylinder of an internal combustion engine of a vehicle, said non-transitory computer readable storage medium comprising:
    instructions for opening said electrically actuated valve at a first position and closing said electrically actuated valve at a second position without activating a valve opening coil, during a cycle of said cylinder; and
    instructions for opening said electrically actuated valve at a third position based on the crankshaft angle at which said second position occurs and closing said electrically actuated valve at a fourth position during a subsequent cycle of said cylinder, where the third position is increased as the second position increases.

* * * * *